April 19, 1966 G. R. BANGE ETAL 3,246,973
APPARATUS AND METHOD FOR HEALING GLASS LINED PIPE
Filed July 14, 1961 2 Sheets-Sheet 1

INVENTORS.
GLENN R. BANGE
MAYNARD J. JONES
BY HERBERT F. YOUNG

ATTORNEYS

United States Patent Office 3,246,973
Patented Apr. 19, 1966

3,246,973
APPARATUS AND METHOD FOR HEALING
GLASS LINED PIPE
Glenn R. Bange, Pittsford, and Maynard J. Jones and
Herbert F. Young, Rochester, N.Y., assignors to
Pfaudler Permutit Inc., Rochester, N.Y., a corporation
of New York
Filed July 14, 1961, Ser. No. 124,034
20 Claims. (Cl. 65—28)

This invention relates to apparatus and method for healing or annealing the end of a glass lined pipe after it has been cracked and chipped and more particularly to apparatus and method for healing or annealing the end of a glass lined pipe after it has been field-cut thereby cracking or chipping the end of the pipe where cut.

Glass lined pipes are highly desirable in certain industries such as the chemical industry where there is a need for pipe having corrosion resistant properties. Such pipe comprises a metal outer pipe of steel interiorly lined with glass of suitable selected thickness. The composite metal pipe with glass lining fused thereto has presented the answer to many problems where highly corrosive acids and other fluids are conveyed from one piece of apparatus to another. However, use of such composite pipe has persented numerous problems. One of the greatest inconveniences was having such pipe prepared to specification at the plant where produced. Every effort has been made to overcome this disadvantage because it unduly discouraged widespread use of such pipe which otherwise presented many advantages where corrosive substances must be handled.

This disadvantage was greatly mitigated by an invention described in detail in the copending application of Herbert F. Young and Donald E. Diehl, Serial No. 828,344, now Patent No. 3,156,035, filed July 20, 1959, by presenting a method for healing the cracked and chipped end of a field-cut pipe after being ground down did present a smooth, gasket facing surface wider than the tip of the glass liniing of the pipe.

Despite the disadvantages overcome by the invention described in the copending application, there were still inherent disadvantages in the system therein described and claimed that our present invention overcomes.

As described in the heretofore mentiioned copending application, a portable metal furnace was used for supporting the pipe to be healed or annealed and in accordance with the description and claims, the pipe was heated on its exterior surface in a portable furnace.

One of the advantages of the present invention over that described in the copending application is that the apparatus for healing the field-cut end of the glass lined pipe is supported by the pipe to which it is clamped rather than the pipe being supported by the furnace. This arrangement permits the use of a very lightweight furnace since it does not have to counterbalance a long heavy pipe being fired therein.

It is one object of our invention to provide improved methods and apparatus for healing glass lined pipe after it has been field-cut.

It is another object of our invention to provide an improved method of joining and sealing separations in glass lined pipe.

A further significant object of our invention is the provision of methods and apparatus appreciably reducing the time necessary to heal the end of field-cut glass lined pipe.

It is an important object of our invention to provide simple lightweight apparatus, simple to operate and physically easy to handle in the field for accomplishing the above objects.

Glass is relatively weak in tension and relatively strong under compression. It will be understood that when heat is applied on the exterior surface of the composite pipe as previously described in the heretofore mentioned copending application that the glass is under tension. The glass was under tension because the metal portion of the composite glass lined pipe was heated initially, thereby tending to expand away from the glass, whereas under the concept of our present invention, the glass lining is heated first thereby expanding and placing it under compression. Therefore, it is an additional object of our invention to provide method and apparatus for healing the end of field cut glass lined pipe whereby the glass liner is under compression.

An attendant disadvantage of the previous apparatus and method, described in the copending application mentioned above, was the warping of the metal pipe resulting from excessive heat necessary to heat the interior glass lining to fusing temperature. This presented a significant disadvantage as compared to our present invention because it was necessary to heat the metal above the glass fusing temperature, resulting in oxidation and scale, as well as warping. Oftentimes former method resulted in breaking of the bond between the glass liner and the metal pipe. Therefore, it is a further object of our invention to provide apparatus and method for applying heat interiorly of composite glass lined pipe for healing field-cut ends of the glass lining, thereby preventing scaling, oxidation and warping of the metal pipe and breaking of the bond between the glass liner and metal pipe.

Other objects and advantages of our invention will be particularly set forth in the claims and will be apparent from the following description when taken in connection with the accompanying drawings, in which:

At the outset we shall describe briefly the process for preparing composite glass lined pipe for joinder with other pipe or pipe joints. The glass lined pipe is cut to the selected length and threaded on either end. Each end of the field-cut glass lined pipe to be healed is received by a portable furnace having a vertically extending candle heating element positioned interiorly of the pipe.

Figure 2:
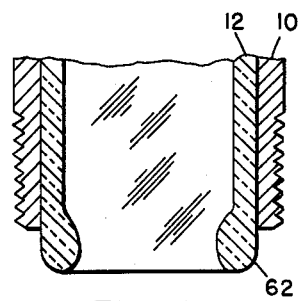
FIG. 2 is a fragmentary cross-sectional view of the pipe of FIG. 1 after it has been heated or fired interiorly to a temperature sufficient to render the glass viscous and softened so that the lower end of the glass sags slightly.

Thereafter, the portable furnace is clamped to the pipe and sufficient heat is provided interiorly of the pipe by the heating element to render the glass lining viscous and softened until it sags out of the end of the threaded pipe as illustrated in FIG. 2. An abrasive wheel is applied to the sagging portion of the glass liner, extending below the end of the metal pipe, until a smooth gasket facing surface, flush with the end of the threaded pipe, is provided for joinder with other pipe.

Figure 1:
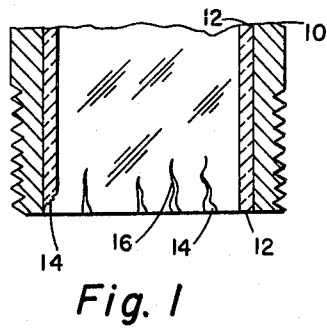
FIG. 1 is a fragmentary cross-sectional view of a portion of field-cut glass lined pipe, after it has been threaded.

We shall now describe the process and apparatus more in detail. With reference to FIG. 1, we have illustrated a composite glass lined pipe comprising an outer cylindrical metallic shell 10 and an inner glass lining 12 fused thereto. FIG. 1 illustrates the appearance of the end of the glass lining after a saw or abrasive disc has cut the composite pipe to the selected length. Cutting of the pipe produces cracks or separations in the glass illustrated at 16 and pieces of the glass are chipped from the end, as illustrated at 14.

It is, of course, necessary to eliminate such cracks and chips in order to provide a satisfactory pipe end for sealing and joinder with other pipe or pipe fittings. Unless such chipped and cracked portions of the glass were eliminated, the corrosive fluid to be conducted through the composite pipe 10 would soon eat through the metal shell 10.

Figure 4:
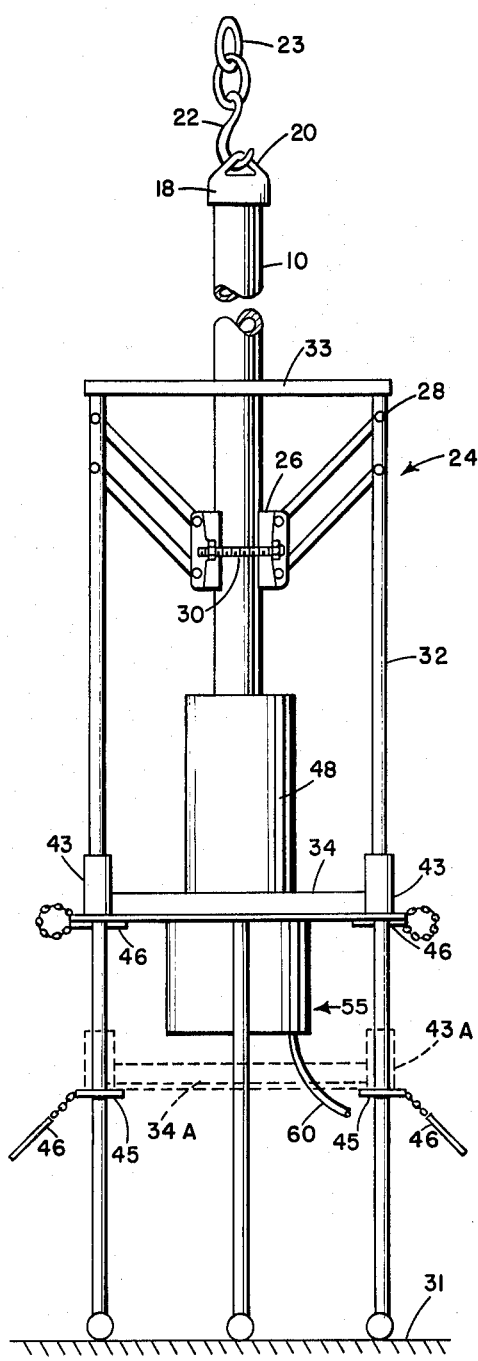
FIG. 4 is a side elevational view of a portable furnace and a section of composite glass lined pipe supporting the portable furnace.

With reference to FIG. 4, the end of the pipe 10 opposite that illustrated in FIG. 1 is provided with threads (not shown) mating with a threaded cap 18 having a handle 20 for receiving a hook 22 supported by a chain 23 in turn controlled by a lift (not shown). In this manner, the pipe 10 may be supported and moved to the selected position, vertically or horizontally.

A portable furnace, generally indicated by the numeral 24, is attached to the pipe 10 by means of clamps 26 hinged at 28 to oppose the weight of the portable furnace 24. Thus, we have provided a self-chucking portable furnace supported by the pipe 10. Once the clamps 26 are secured to the pipe 10, by means of through bolts 30, elevation of the pipe 10 off of the floor 31 by the lift (not shown) carries the lightweight (approximately 7 pounds) portable furnace 24 upward with the pipe.

Figure 5:
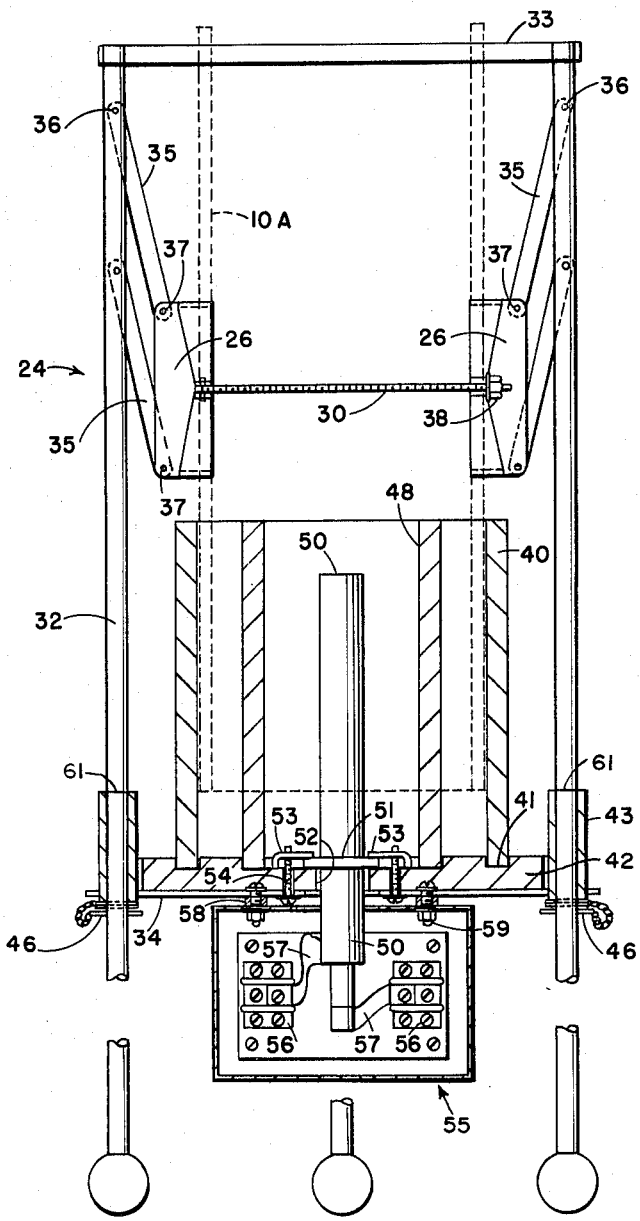
FIG. 5 is an enlarged cross-sectional view of the portable furnace illustrated in FIG. 4.

With reference to FIG. 5, we shall now describe the details of the portable furnace. The frame of the furnace comprises a plurality of vertical support rods 32. Two support rods 32 oppositely disposed are provided with longitudinally extending slots or grooves (not shown) adapted for receiving links 35 pivotally mounted therein at 36 in spaced relationship. Support rods 32 are held in rigid spaced relationship at their upper ends by an upper yoke or frame 33 and at their lower end by a lower yoke or support frame 34. The opposite ends of links 35 are hinged at 37 to clamps 26.

The combination of the clamps 26, hinged to the rods 32 by means of links 35 provide a self-chucking clamp effectively suspending the furnace 24 on the rod 10. The two through bolts 30, passing through apertures on opposite sides in both clamps 26, receive nuts 38 which frictionally secure the clamps 26 and in turn the furnace 24 to the pipe 10.

At 10a we have illustrated in broken lines the largest diameter pipe this embodiment of the portable furnace is adapted to receive. It will be noted that this fits concentrically just inside of a cylindrical ceramic fiber insulator 40 being supported in an annular groove 41 of a ceramic fiber insulating pad 42. The insulating pad 42 is supported by the lower support frame 34 and held in rigid alignment in spaced relationship to support rods 32 by bushings 43. Bushings 46 may be rigidly mounted on rods 32 to maintain pad 42 and support frame 34 in fixed relationship to the rods. In the alternative, the bushings may be mounted to slide on rods 32 between a lower position shown in broken lines at 43A in FIG. 4 where the bushings are supported by collars 45 rigidly mounted on rods 32 and the raised position shown in solid lines. When this alternative arrangement is used, bushings 43A and lower support 34A may be supported in the raised position by pins 46 received in holes (not shown) which are bored transversely in rods 32.

The alternative arrangement has the distinct advantage of providing a heating element 50 and cylindrical insulator 40 which are conveniently slidable to a position where the operator may inspect the progress of the firing of the glass lining and degree of sagging of the glass during operation of our invention.

For purposes of illustration, we have shown a second cylindrical ceramic fiberglass insulator 48 of smaller diameter, than insulator 40. It will be understood that this is for use with glass lined pipes of smaller diameter than that of the interior diameter of insulator 48. Preferably the interior diameter of the cylindrical ceramic fiberglass insulator used is as close as possible in size to the outside diameter of the glass lined pipe. This arrangement confines the heat to the work area, and to this end, it is desirable to have a furnace which is adaptable for receiving and supporting more than one size cylindrical ceramic fiberglass insulator such as shown at 40 and 48.

A cylindrical vertically disposed axially extending carbon heating element 50 is provided with an annular flange 51 spaced from both ends of the heating elements and being supported by the upper surface of the insulating pad 42. The lower end of the carbon heating element 50 is received in a hole or bore 52 located in the center of insulating pad 42.

Clamps 53 and bolts 54 provide a clamping device for rigidly securing the heating element 50 and the insulating pad 42 to the lower support frame 34.

The heating element 50 is electrically actuated, preferably to a temperature ranging between 1500° F. and 1600° F. by a commercially available electrical unit, generally indicated by the numeral 55, provided with terminal blocks 56 to which the heating element 50 is connected by conductors 57. The electrical unit 55 is spaced from lower support frame 34 by spacers 58 and carried by frame 34 by bolts 59.

We shall now describe the operation of our apparatus. With reference to FIG. 4, the pipe 10 is inserted into the cylindrical ceramic fiberglass insulator 48 with the heating element 50 (see FIG. 5) vertically disposed in the center thereof. Then, the clamps 26 are rigidly secured to the pipe 10. The lift (not shown) raises the hook 22 thereby raising the pipe 10 and the portable furnace 24 supported thereon. If the alternative slidably adjustable lower support frame 34A is used, the lower end of the pipe is hung level with indicator markers 61 (see FIG. 5). Then the clamps 26 are secured to the pipe 10, after which the insulator 48 and heating element 50 mounted on frame 34A are adjusted upwardly to the solid line position illustrated in FIGS. 4 and 5.

The center of gravity of a long heavy pipe requires a very heavy furnace if it is supported thereby. Applicants' arrangement provides a lightweight portable furnace being supported by the pipe itself.

With reference to FIG. 5, the furnace 24 is connected to a source of electricity (not shown) and current is supplied through the wires 60 to the electrical unit 55, which in turn supplies current to the heating element 50. The temperature of the heating element is elevated to substantially 1500° F. or 1600° F. for a period of time sufficient to render the glass lining 12 soft and viscous until it sags slightly at the lower end to define a protruding enlarged annular ring of glass 62 shown in FIG. 2. This softening of the glass until viscous heals the chipped away portions 14 and cracks 16.

Figure 3:
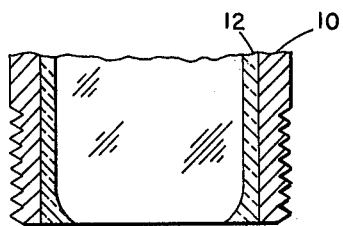
FIG. 3 is a fragmentary cross-sectional view of the end of the pipe shown in FIG. 2 after the sagging portion of the glass has been ground flush with the end of the outer metallic pipe.

After the glass has been heated to produce the annular glass ring 62, viewed in FIG. 2, the lift (not shown) lowers the hook 22, pipe 10 and portable furnace 24 until the lower end of the support rod 32 engages the ground or floor 31. Thereafter the nuts 38 threaded onto the bolts 30 are backed off to free the clamps 26 from the pipe 10. The pipe 10 and glass liner 12 are permitted to cool and subsequently the lower protruding portion of the annular glass ring 62 is ground off flush with the lower end of the threaded portion of the metallic cylindrical pipe 10 to provide a finished gasket facing surface as illustrated in FIG. 3 at 63. Thus, an enlarged cross-sectional surface area of the glass lining 12 is thereby provided. This furnishes a desirable enlarged gasket facing surface.

It will be understood from the above description that the described method and the novel apparatus for carrying out the method accomplishes all of the above stated objects.

According to our invention, the only essential tools to prepare a glass lined pipe for joinder with other pipe or pipe fittings are those tools necessary for cutting and threading, the lightweight portable furnace 24, means for supporting the pipe and furnace, and suitable grinding polishing tools to provide the smooth gasket facing surface 62 shown in FIG. 3.

While we have shown and described the preferred form of our invention, it will be apparent that various modifications and changes may be made therein, particularly in the form and relation of parts, without departing from the spirit of the invention as set forth in the appended claims.

We claim:

1. A method of preparing glass lined pipe for joinder comprising the steps of: supporting said pipe in substantially vertical orientation, applying heat internally of said pipe while oriented vertically until the glass lining of the portion of said pipe being heated becomes softened and sags out of the lower end of said pipe to define an annular glass projection, cooling said pipe and grinding said projection to provide a gasket facing surface.

2. A method of preparing glass lined pipes for joinder comprising the steps of: supporting said pipe substantially vertically surrounding a heating element, applying heat internally of the end of said glass lined pipe being prepared with said heating element until the glass lining of the portion of said pipe being heated becomes soft and sags out of the heated end of said pipe thereby defining an annular glass projection, cooling said pipe and grinding said projection to provide a gasket facing surface.

3. A method of preparing glass lined pipe for joinder comprising the steps of: attaching to said pipe a furnace having a vertically disposed heating element being received internally of said pipe when attached thereto, suspending said pipe and attached furnace in a substantially vertically disposed position, applying heat internally of the end of said glass lined pipe to be prepared with said heating element until the glass lining of the portion of said pipe being heated becomes soft and sags out of the heated end of said pipe thereby defining an annular glass projection, cooling said pipe and glass lining and grinding said projection to provide a gasket facing surface.

4. Apparatus for preparing glass lined pipe for joinder comprising, in combination, an axially extending heating element constructed to be received in said pipe for applying heat internally of said pipe until said glass lining becomes soft and means connected to said pipe for maintaining said heating element internally of said pipe in a substantially vertically disposed position.

5. Apparatus for preparing glass lined pipe for joinder comprising, in combination, an axially extending heating element smaller in diameter than said pipe, means for actuating said element to heat said glass lining until soft, heater support means attachable to said pipe for supporting said heating element inside of said pipe and means for supporting said pipe in a substantially vertically disposed position.

6. Apparatus in accordance with claim 5 in which said heater support means are constructed to be supported from a free end of said pipe when suspended.

7. Apparatus in accordance with claim 5 including insulation means attached to said support means exteriorially of said pipe for insulating said support means from heat produced by said heating element.

8. Apparatus in accordance with claim 5 in which said support means includes wedge means attachable to said pipe for supporting said heating element in opposition to the weight of said heating element and support means when said pipe is suspended.

9. Apparatus in accordance with claim 5 in which said heater support means includes adjustable means for moving said heating element relative to said pipe without detaching said heater support means, thereby permitting the operator to observe the progress of healing the pipe during the process.

10. A method for healing a glass lined article comprising the step of: applying heat internally to a selected portion of said article to be healed until the glass lining of said portion becomes soft and healed.

11. A method for healing cracks, chips and the like in glass lined pipe comprising the steps of: properly orienting said pipe to permit softened glass in the area of said cracks, chips, or the like to heal the same, and applying heat internally of said pipe at said area until the glass lining at said area becomes soft and heals said cracks, chips, and the like.

12. A method of preparing an open end of a glass lined pipe for joinder comprising the steps of: orienting said pipe, applying heat internally to an area surrounding said open end until the glass lining becomes soft and sags out of the open end to define an annular glass projection, cooling said pipe and grinding said projection to provide a gasket facing surface.

13. Apparatus for heat treating glass lined pipe comprising, in combination: an axially extending heating element constructed to be received in said pipe for applying heat internally of said pipe and means for supporting said heating element internally of said pipe at a selected position therein.

14. Apparatus for heat treating glass lined pipe comprising, in combination: an axially extending heating element constructed to be received in said pipe for applying heat internally of said pipe, and means for supporting said heating element internally of said pipe in radially spaced substantially concentric relationship to said glass lining.

15. A method for preparing glass lined pipe comprising the step of: cutting said glass lined pipe thereby creating cracks, chips and the like in the glass lining, applying heat internally to a selected portion of said pipe where said cracks, chips or the like occur until the glass lining of said portion becomes soft and heals said cracks, chips and the like.

16. A method for heat treating glass lined pipe comprising, supporting an axially extending heating element constructed to be received in said pipe at a selected position in said pipe, and heating a selected portion of the glass liner with said element until soft.

17. A method of joining separations in glass lined pipes comprising, applying heat internally of the glass lining at said separation until the entire periphery of the adjacent edges of said separation are fused.

18. A method of healing a glass lined non-glass article comprising the steps of: applying heat internally to a selected portion of said article to be healed until the glass lining of said portion becomes soft and healed.

19. A method for healing a glass lined metal article comprising the steps of: applying heat internally to a selected portion of said article to be healed until the glass lining of said portion becomes soft and healed.

20. A method for healing a glass lined article comprising the step of: applying heat internally to a selected portion of said lining to render the glass lining under compression with said article and until said lining becomes soft and is healed.

References Cited by the Examiner

UNITED STATES PATENTS

| | | | |
|---|---|---|---|
| 494,671 | 4/1893 | Cooper | 285—55 |
| 896,374 | 8/1908 | Frick | 34—104 |
| 2,189,860 | 2/1940 | Frei | 65—61 |
| 2,385,071 | 9/1945 | Grier | 65—61 |
| 2,613,480 | 10/1952 | Mongan | 263—5 |
| 2,705,627 | 4/1955 | Norgaard | 263—5 |
| 2,888,783 | 6/1959 | Turnbull | 285—149 |
| 2,978,839 | 4/1961 | Eastus et al. | 65—284 |

DONALL H. SYLVESTER, *Primary Examiner.*